Jan. 23, 1962 L. P. FRIEDER ET AL 3,018,210
BALLISTIC HELMET AND METHOD OF MAKING SAME
Filed May 9, 1955 3 Sheets-Sheet 2
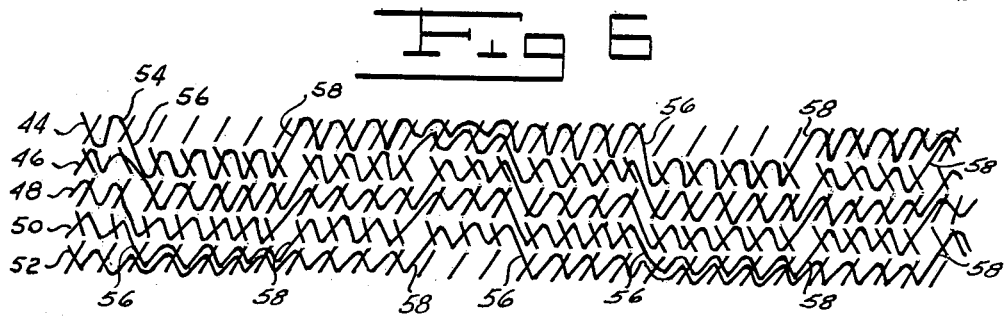
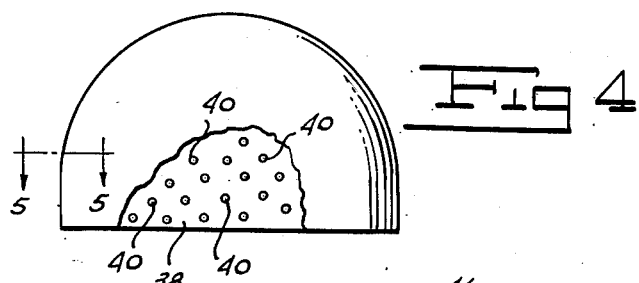
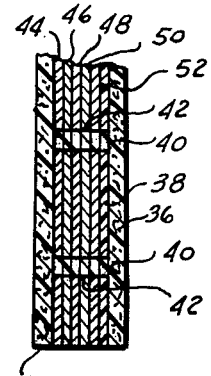
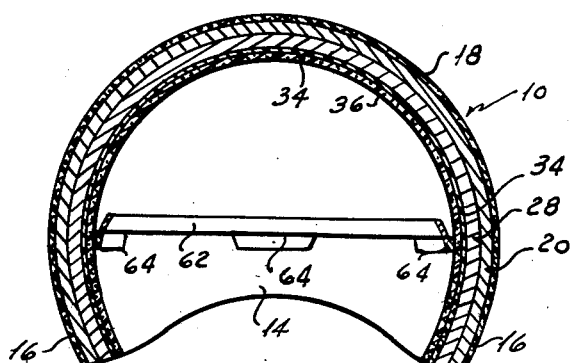
INVENTORS
LEONARD P. FRIEDER
MICHAEL J. FRYER
BY
ATTORNEY

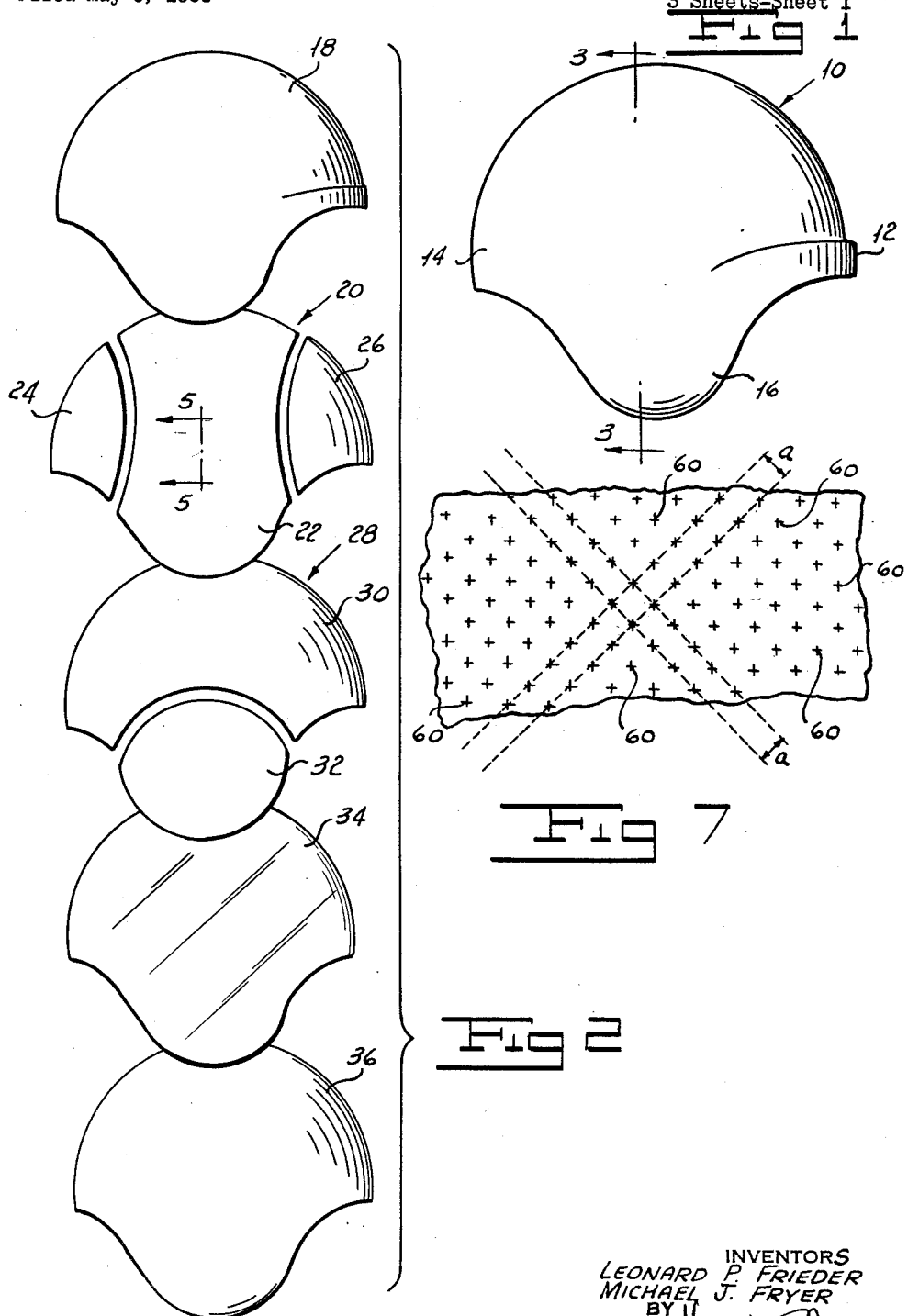

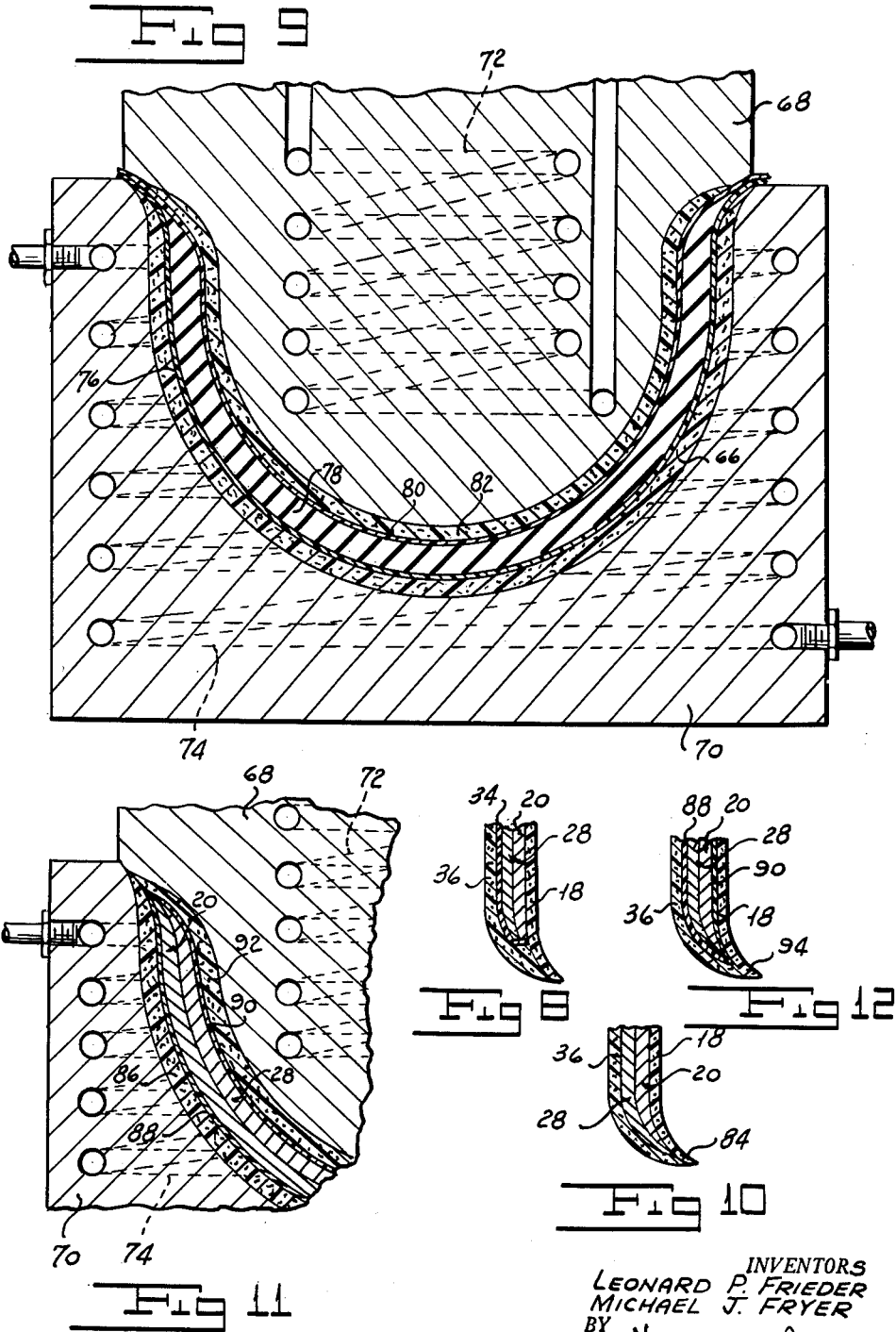

United States Patent Office 3,018,210
Patented Jan. 23, 1962

3,018,210
BALLISTIC HELMET AND METHOD OF
MAKING SAME
Leonard P. Frieder, Great Neck, N.Y., and Michael John Fryer, Carbondale, Pa., assignors to Gentex Corporation, New York, N.Y., a corporation of Delaware
Filed May 9, 1955, Ser. No. 506,955
11 Claims. (Cl. 156—228)

Our invention relates to an improved ballistic helmet and more particularly to an improved ballistic helmet which is light and which has superior projectile penetration resisting properties.

In the manufacture of protective articles of wearing apparel, plastic armor has largely replaced armor formed of metal. Protective helmets, as well as other articles of apparel, have been formed of laminated plastic armor, which is lighter than metal while affording the same or an increased degree of protection. In the copending application of Leonard P. Frieder and Walter S. Finken, Serial No. 430,938, filed May 19, 1954, now Patent No. 3,001,900, a laminated plastic article including a number of simultaneously molded plastic-impregnated fibrous laminates is disclosed. The resin-impregnated fibrous laminates delaminate under impact to resist penetration by flying fragments, missiles and the like. While this article and other similarly formed articles are lighter than articles formed of metal, they are still somewhat heavy owing to the resin which impregnates all laminates. In the copending application of Leonard P. Frieder and Walter S. Finken, Serial No. 362,338, filed June 17, 1953, now Patent No. 2,816,578, a plastic cloth is disclosed including a number of fabric laminates woven to provide spaced bonds between adjacent laminates. As is pointed out in this copending application, Serial No. 362,338, this cloth has superior ballistic properties and is lightweight. We have found it to be advantageous to use a ballistic cloth such as is disclosed in application Serial No. 362,338 to form an improved ballistic helmet which is lighter than helmets of the prior art. Great difficulty has been experienced in the prior art in attempting to manufacture helmets out of ballistic cloth owing to the fact that it is extremely difficult to shape the cloth to the configuration of a helmet. In the prior art it has been necessary to surface-coat or lightly impregnate a number of sheets of fabric to form a helmet. The resulting construction is heavy owing to the flow of resin throughout the sheets of fabric. Such construction, furthermore, does not afford as high a degree of protection as does the fabric disclosed in the copending application Serial No. 362,338.

Helmets of the prior art generally include some securing means, such as rivets or the like, for holding the suspension by means of which the helmet is supported on the wearer's head. A rivet or the like may act as a secondary missile and cause injury to the wearer if a flying fragment or the like strikes it. It is desirable, therefore, that some means be provided for holding the helmet suspension within the helmet without the danger of this means acting as a secondary missile.

We have invented an improved ballistic helmet which includes an unimpregnated layer of the ballistic cloth disclosed in application Serial No. 362,338. Our improved helmet is lightweight. It has superior ballistic properties to protective helmets of the prior art. We provide our helmet with means for retaining the helmet suspension within the helmet without the danger of any secondary missile action. We have also invented methods by which our improved ballistic helmet may rapidly and expeditiously be formed.

One object of our invention is to provide an improved ballistic helmet which is lightweight.

A further object of our invention is to provide a ballistic helmet which has superior penetration resisting qualities to protective helmets of the prior art.

A still further object of our invention is to provide an improved ballistic helmet including means for retaining the helmet suspension within the helmet without the danger of secondary missile action.

Another object of our invention is to provide a method of forming an improved ballistic helmet.

Other and further objects of our invention will appear from the following description.

In general, our invention contemplates the provision of a ballistic helmet including a layer or layers of unimpregnated ballistic cloth sandwiched between a hard inner shell or liner and a hard outer shell or cover. When we form the inner or both shells of our helmet concurrently with the formation of the helmet itself, we provide means for preventing the contamination of the ballistic cloth by the material impregnating the shells.

In one method of forming our ballistic helmet, we first premold a thin outer shell of predetermined thickness from any suitable material, such as a resin-impregnated fibrous glass mat. We cut a layer or layers of ballistic cloth, such as disclosed in the said copending application Serial No. 362,338, and place the layers within the outer shell to form a smooth surface. We place a sheet of material, nonadherent with respect to the ballistic cloth and with respect to the material of which the inner shell is formed, over the surface of the ballistic fabric. We mold the thin inner shell within the assembly of the outer shell, ballistic fabric, and nonadherent film to form the helmet. We secure means for retaining the suspension means within the helmet to the surface of the inner shell.

In an alternate method of forming our helmet, we first simultaneously premold the inner and outer shells by placing layers of fibrous, resin-impregnated material, separated by a layer of industrial rubber, within a mold. After the shells have been cured, we assemble the helmet and secure it in assembled relationship by fusing the inner and outer shells around their peripheries. It will be appreciated that this form of our invention need not include any film of nonadherent material for preventing the contamination of the ballistic material.

In a third method we place a layer of resin-impregnated fibrous material, a sheet or film of material nonadherent with respect to the impregnating material, a layer or layers of ballistic fabric, a second sheet or film of material nonadherent with respect to the impregnating material, and a second layer of resin-impregnated fibrous material within an open mold member. We then mold the assembly to cure the inner and outer layers of resin-impregnated fibrous material to form the helmet. The areas of the films of nonadherent material are limited so that the inner and outer layers of resin-impregnated material fuse during the molding.

In the accompanying drawings which form part of the instant specification and which are to be read in conjunction therewith and in which like reference numerals are used to indicate like parts in the various views:

FIGURE 1 is a side elevation of one form of our improved ballistic helmet.

FIGURE 2 is an exploded view showing the various component parts of the form of our ballistic helmet shown in FIGURE 1.

FIGURE 3 is a sectional view of our ballistic helmet taken along the line 3—3 of FIGURE 1.

FIGURE 4 is a side elevation with a part broken away of a second form of our improved ballistic helmet illustrating one means for holding the inner and outer shells in assembled relationship.

FIGURE 5 is a fragmentary sectional view, drawn on an enlarged scale, taken along the line 5—5 of FIGURE 4.

FIGURE 6 is a schematic sectional view showing the weave employed in forming the ballistic cloth used in our improved ballistic helmet.

FIGURE 7 is a fragmentary plan view of the ballistic cloth used in our ballistic helmet.

FIGURE 8 is a fragmentary sectional view of a form of our ballistic helmet showing an alternate means for ho'ding the inner and outer shells in assembled relationship.

FIGURE 9 is a sectional view of molding apparatus showing the simultaneous formation of the inner and outer shells of our improved ballistic helmet.

FIGURE 10 is a fragmentary sectional view of a form of our ballistic helmet made from shells simu'taneously molded according to the method illustrated in FIGURE 9.

FIGURE 11 is a fragmentary sectional view of molding apparatus showing the molding of our ballistic helmet as a unit.

FIGURE 12 is a fragmentary sectional view of a form of our ballistic helmet made according to the method illustrated in FIGURE 11.

More particularly referring now to FIGURES 1 and 3 of the drawings, this form of our improved ballistic helmet, indicated generally by the reference character 10, includes a front 12, back 14 and a pair of sides 16 shaped to provide protection for the ears of the wearer. The outer shell 18 of our protective helmet is formed of any matted, felted, woven, knitted or braided fibrous material. Preferably, we employ spun glass fibers, but any other material, such as nylon or the like, may be used. The fibrous mat or the like is impregnated with a suitable thermoplastic or thermosetting material such, for example, as po'yethylene plastic, allyl plastic, polystyrene plastic, phenol formaldehyde compound, and urea formaldehyde resin or the like.

After the outer shell or cover 18 has been molded to the desired shape, we cut a layer of ballistic cloth for insertion within outer shell 18. This layer, indicated generally by the reference character 20, includes a first piece 22 cut to a somewhat dumbbell shape to be laid within the outer shell 18 with the ends of the dumbbell-shaped piece 22 at the portions 16 of the outer shell. A pair of side pieces 24 and 26 are inserted within the outer shell 18 to complete the layer 20. Conveniently, to hold the pieces 22, 24 and 26 within the shell 18, we employ a nonhardening adhesive, such as a rubber cement. This merely retains the layer 20 in proper position within shell 18 until the fabrication of the helmet is complete. The seam or line of juncture between the piece 22 and pieces 24 and 26 may be provided with a scarf joint or may be sewn or merely closely abutted. The shape of pieces 22, 24 and 26, together with the smooth joints between the pieces, gives a smooth contour to the layer 20.

If necessary or desirable, a second layer, indicated generally by the reference character 28, of ballistic fabric may be inserted within the layer 20. Layer 28 includes a somewhat dumbbell-shaped piece 30 and a pair of complementary pieces 32. As can be seen by reference to FIGURE 2, the disposition of pieces 30 and 32 within the layer 20 is such that the joints or seams between pieces 32 and piece 28 are not in line with the joints between pieces 24 and 26 and piece 22. This orientation of layer 28 with respect to layer 20 minimizes lines of weakness in the helmet. Pieces 30 and 32 are laid up within layer 20 and joined with each other in the same manner as are pieces 22, 24 and 26 within the outer shell 18. Layer 28 may be secured within layer 20 by an adhesive, such as rubber cement or the like, to retain layer 20 in position. It is to be noted that the rubber cement is a non-setting adhesive. If a setting adhesive is used to secure the layer 20, it is important that the layers be tacked to each other at separated spots in order to avoid a continuous resinous bond. It is to be understood further that any appropriate number of layers of ballistic fabric may be employed.

After a desired number of layers of ballistic fabric have been laid within the outer shell 18, we place a film 34 of material nonadherent with respect to the last ballistic fabric layer 30 and nonadherent with respect to the material of which our inner liner to be described hereinafter is formed. Film 34 is shaped to fit reasonably smoothly over the inner surface of the layer 30. This nonadherent film may be any suitable material, such as cellophane, aluminum foil or the like.

After outer shell 18, layers 20 and 28 and film 34 have been assembled, we mold a hard inner liner 36 within the assembly. It will be appreciated that outer shell 18, layers 20 and 28 and film 34 may be assembled within a mold or placed within a mold after assembly. We form the inner liner 36 of any suitable material, such, for example, as one of the fibrous resin-impregnated materials of which the outer shell 18 is formed. Preferably, we lay a suitably cut mat of glass fibers within the film 34 and impregnate it with resin, such as a polyester resin, by any convenient means, such, for example, as a spatula. After the mat or the like has been impregnated, it is cured in a conventional manner, as by bag molding or by the use of matched metal molds. If the finished helmet is to have a re-entrant shaped cross section as shown in the form of helmet in FIGURES 1 to 3, the bag molding technique is employed. In this form of our invention, the shape of the helmet holds the outer and inner shells 18 and 36 together with the layers 20 and 28 in assembled relationship without the use of auxiliary securing means. If desired, a strip of any suitable material may be applied to the periphery of the helmet.

In the form of our invention shown in FIGURES 4 and 5, the helmet has a hemispheric shape in cross section, with the result that some means must be provided for holding the shells and layers in assembled relationship. In order to achieve this, we provide the nonadherent film 38 of this form of our invention with spaced perforations 40 over its surface. It will be appreciated that matched metal dies or molds may be employed to mold the inner shell 36 in this form of our invention. As can be seen in FIGURE 5, in the course of molding, some of the impregnating resin of the inner shell 36 passes through perforations 40 in film 38 to form spaced bonds 42 between the outer and inner shells 18 and 36. In order to ensure the proper flow of resin through layers 20 and 28, we may perforate the layers of fabric at points corresponding to the points at which the film 38 is perforated. It is to be noted that the number of bonds 42 is limited to that which is sufficient to hold the shells and layers in assembled position, bonds 42 having negligible effect on the ballistic qualities of the helmet. The resin forming bonds 42 extend over only a very minor portion of the area of any of the ballistic cloth layers.

Preferably, we use ballistic cloth of the type disclosed in the said copending application Serial No. 362,338 to form the layers 20 and 28. FIGURES 6 and 7 show one form of this ballistic cloth including, for example, five fabric laminates 44, 46, 48, 50 and 52. As can be seen by reference to FIGURE 6, a weaving end 54 of laminate 44 is drawn down at a point 56 to form part of the next lower laminate 46. It is again drawn up into laminate 44 at a point 58. The same weaving procedure is followed for selected weaving ends which may be warps or wefts in all the other laminates. As can be seen by reference to FIGURE 7, the result of this weaving pattern is a ballistic cloth including a plurality of fabric laminates having spaced bonds between adjacent laminates at points 60 over the surface of the fabric. Conveniently, bonds 60 are located at the corners of a square or diamond having a side length $a$. The distance $a$ and the configuration formed by bonds at points 60 is selected to provide optimum ballistic qualities in the fabric. As is pointed out in the said copending application, Serial No. 362,338, weaving ends, such as the end 54, preferably are formed of yarns made up of synthetic continuous filament threads spun to a predetermined number of convolutions per unit length. The action of the ballistic fabric layers 20 and 28 in resisting penetration by flying fragments, missiles and the like is explained in detail in the said copending application Serial No. 362,338.

Referring again to FIGURE 3, the suspension means employed with our improved ballistic helmet includes a flexible ring 62 formed of a suitable material, such as metal, plastic or the like. In order to support ring 62 and the suspension (not shown) carried thereby within my improved ballistic helmet without the use of means which could act as a secondary missile, we secure or form a number of lands or bosses 64 to the interior of the inner liner 36. The number and length of the lands 64 should provide a relatively long line of contact with the lower edge of ring 62 to distribute strain over a wide area of the inner shell 36. Each land 64 should project inwardly along its length from the inner surface of shell 36 to a fixed distance from the center of the helmet. Where bag molding is employed the inner surface of liner 36 is relatively rough so that lands or bosses 64 are welded to the inside of liner 36. Conveniently, this could be accomplished by heating plastic segments or strips and pressing them radially by means of a jig against the inner surface of liner 36 until the plastic cools to form a bond between the segments and liner 36. Where matched dies are used to form a helmet having a hemispherical cross section, the male mold or die may conveniently be provided with re-entrant portions to form the lands 64.

If desirable, the edge of the finished helmet may be sealed off by use of a sealing resin or by laying a bias cut tape impregnated with resin along the edge of the helmet. In some cases a sponge rubber or other beading may advantageously be applied to the edge of the helmet.

One method by which we form our improved ballistic helmet includes the steps of preforming the hard outer shell or cover 18, cutting a ballistic fabric to form pieces, such as pieces 22, 24 and 26, and laying the pieces within cover 18 to form a smooth contour. Additional ballistic cloth layers, such as layer 28, may, if desired, be laid within layer 20. After the desired number of ballistic cloth layers have been laid up within outer shell 18, a film 34 of a material nonadherent with respect to the ballistic cloth of layers 20 and 28 and with respect to the material of which liner 36 is to be formed is applied to the inner surface of the last layer of ballistic cloth inserted in cover 18. The next step in the formation of our improved ballistic helmet is molding the inner shell 36 within the assembly of cover 18, the layers of ballistic cloth and the film 34. Suspension supporting lands 64 are then applied to the inner surface of the molded liner 36. If the helmet is of the form of our invention shown in FIGURES 1 to 3, the bag molding technique is used. If the helmet has a hemispherical cross section as in the form of our invention shown in FIGURES 4 and 5, a perforated film 38 may be employed and matched metal dies may be used to mold liner 36. In this case, the lands or bosses 64 may be formed during the molding step. As can be seen by reference to FIGURE 8, when formed according to this method, our helmet includes only a single non-adherent film 34.

Referring now to FIGURE 9, we have invented a convenient and expeditious method for forming the inner shell 36 and the outer shell 18 of our ballistic helmet simultaneously. It will be appreciated that the simultaneous formation of the two shells is advantageous, since it ensures that the shells are properly sized with respect to each other. In order to accomplish this simultaneous formation of the shells, we first lay up a layer 66 of resin-impregnated fibrous material in one mold member 70 of a pair of complementary cooperating mold members 68 and 70. Respective heating coils 72 and 74 in the mold members 68 and 70 provide means for passing a heating medium, such as steam or the like, through the mold members. We place a nonadherent film 76 of cellophane over the resin-impregnated fibrous material 66. In order to ensure that the proper space is formed between the inner and outer shells, we dispose a layer 78 formed of industrial rubber or other suitable material over the cellophane film 76. A second film of nonadherent material, such as cellophane film 80, separates the layer 78 of industrial rubber from a layer 82 of resin-impregnated, fibrous material of which the inner shell 18 of our ballistic helmet is to be formed. We bring the mold member 68 into cooperative relationship with member 70 and cure the layers 66 and 82 by application of heat and pressure as is known in the art to form the respective inner shell 36 and outer shell 18. Films 76 and 80 protect the layer 78 against contamination by the material impregnating layers 66 and 82. It is to be noted that films 76 and 80 extend a sufficient distance around their peripheries to prevent bonding between layers 66 and 82 during curing. After the shells have been cured, the mold members are separated and the films of cellophane enable us readily to separate the inner and outer shells. We then assemble the ballistic fabric layers 20 and 28 between shells 18 and 36.

Referring now to FIGURE 10, when we simultaneously form shells 18 and 36, we seal the inner shell 36 to the outer shell 18 around the periphery of the helmet by application of heat and pressure to fuse the impregnating material in the respective shells at their peripheries. It will readily be appreciated that we may so form the shells as shown in FIGURE 9 that their respective peripheries engage each other at a point 84 beyond the periphery of the fabric layers 20 and 28. Application of heat and pressure then fuse the impregnating resin in the respective shells to seal the layers 20 and 28 around the periphery of the helmet. It will be seen that when we so form our helmet we need not employ any thin films, such as the film 34 or the film 38, in assembling our helmet.

Referring now to FIGURE 11, we have shown a method by which we may mold our ballistic helmet as a unit in a single operation. We first place a layer 86 of resin-impregnated fibrous material within mold member 70. Over the layer 86 we successively place a film 88 of material nonadherent with respect to the impregnating material of layer 86, a pair of layers of ballistic fabric 20 and 28, a second film 90 of nonadherent material and a layer 92 of resin-impregnated material of which inner shell 36 is formed. We then mold the assembly by bringing mold member 68 into cooperative relationship with member 70 and cure the layers 86 and 92 by the application of heat and pressure to complete the helmet. Films 88 and 90 prevent contamination of the fabric layers 20 and 28 by the material impregnating layers 86 and 92. Films 88 and 90, while protecting fabric layers 20 and 28, do not completely separate layers 86 and 92. They permit bonding between layers 86 and 92 around their peripheries. As can be seen by reference to FIGURE 12, this bonding is indicated at 94. It will be seen that in this method we form the completed helmet as we mold the inner and outer shells 36 and 18.

In use of the form of our invention shown in FIGURES 1 to 3, a flying fragment, missile or the like striking the helmet 10 may have sufficient force to penetrate the hard outer shell 18. Further penetration is resisted by the differential deflection between adjacent laminates of the fabric layers 20 and 28. The spaced bonds at points 60 between adjacent laminates control this differential deflection to afford a high degree of protection to the wearer. The formation of the weaving ends, such as end 54, of the fabric laminates from yarns made up of synthetic continuous filament threads spun to a predetermined number of convolutions per unit length enhances the ballistic properties of the cloth of which layers 20 and 28 are formed. The hard inner shell 36 provides a backing for the fabric layers 20 and 28. The action of the ballistic cloth forming layers 20 and 28 in resisting penetration is explained in detail in the said copending application, Serial No. 362,338. The lands or bosses 64 support the helmet suspension within the helmet and provide sufficient contact with ring 62 to distribute force over a large area of the helmet. The action of the form of our improved ballistic helmet shown in FIGURES 4 and 5 in resisting penetration by flying fragments, missiles and the like is the same as that of the form of our invention shown in FIGURES 1 to 3. The bonds 42 in this form of our invention serve only to retain the parts in assembled condition and do not contribute substantially to the ballistic properties of the helmet. The forms of our helmet shown in FIGURES 8, 10 and 12 have a similar action in resisting penetration.

It will be seen that we have accomplished the objects of our invention. We have provided an improved ballistic helmet which has superior penetration resisting properties to helmets of the prior art. Our improved ballistic helmet is lightweight. We provide our helmet with suspension supporting means which eliminates the secondary missile effect present in suspension securing means of protective helmets of the prior art. We have invented methods by which our improved ballistic helmet may readily and expeditiously be formed.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A method of making a ballistic helmet including the steps of preforming an outer shell to the shape of said helmet from resin impregnated fibrous material, placing a layer of flexible multi-layer penetration resistant fabric within said outer shell, placing a film of material impervious to a resinous impregnating material over said fabric layer, placing a mat of fibrous material impregnated with said resinous impregnating material over said film, and curing said mat.

2. A method of making a ballistic helmet as in claim 1 including the step of cutting a multi-layer penetration resistant fabric to form a smooth surface before placing said layer within said outer shell.

3. A method of making a ballistic helmet as in claim 1 including the step of placing a second fabric layer on said first fabric layer before placing said film.

4. A method of making a ballistic helmet including the steps of preforming an outer shell of resin impregnated fibrous material for the helmet, placing a layer of perforated multi-layer penetration resistant fabric within said outer shell, placing a perforated film of material impervious to a resinous impregnating material on said layer, placing a mat of fibrous material impregnated with said resinous impregnating material over said fabric layer, and curing said mat to form bonds extending through said perforations between said mat and said outer shell.

5. A method of making a ballistic helmet including the step of molding resin-impregnated fibrous material to the shape of said helmet to preform an inner shell for said helmet, molding resin-impregnated fibrous material to the shape of said helmet to preform an outer shell for said helmet, assembling a layer of unimpregnated flexible multi-layer penetration resistant fabric between said inner and outer shells and securing said inner and outer shells and said multi-layer penetration resistant fabric in sandwiched relationship.

6. A method as in claim 5 in which the step of preforming the inner and outer shells includes the steps of placing a layer of resin-impregnated fibrous material within one of a pair of cooperating mold members, placing a film of material impervious to the material impregnating said fibrous material over the layer of said fibrous material, placing a spacer layer over said film, placing a second film of a material impervious to the material impregnating said fibrous material over said spacer layer, placing a layer of resin-impregnated fibrous material over said second film, and curing said first and second resin-impregnated fibrous material layers to form the inner and outer shells.

7. A method of making a ballistic helmet as in claim 5 in which said retaining step includes the step of forming a bond between said inner and outer shells around their peripheries.

8. A method of making a ballistic helmet including the steps of placing a layer of resin-impregnated fibrous material within one of a pair of cooperating mold members, placing a film of material impervious to the material impregnating said fibrous material over the layer of fibrous material, placing a layer of multi-layer penetration resistant fabric over said film, placing a second film of material impervious to the material impregnating said fibrous material over said multi-layer penetration resistant fabric, placing a second layer of resin-impregnated fibrous material over said second film, and curing said first and second layers of resin-impregnated fibrous material to form said helmet.

9. A ballistic helmet including in combination a hard inner shell formed from molded resin-impregnated fibrous material, a hard outer shell formed from molded resin-impregnated fibrous material, said shells being shaped in the configuration of a helmet with the inner shell adapted to be nested within the outer shell, a layer of unimpregnated flexible woven multi-layer penetration resistant fabric between said shells and having a major portion of its surfaces free to move with respect to said shells, said fabric normally permitting the passage therethrough of said resin in its uncured state, a film of material impervious to said shell material impregnating resin in its uncured state disposed between said inner shell and said fabric layer and means for retaining said shells and said layer in assembled relationship.

10. A ballistic helmet including in combination a hard inner shell formed from molded resin-impregnated fibrous material, a hard outer shell formed from molded resin-impregnated fibrous material, said shells being shaped in the configuration of a helmet with the inner shell adapted to be nested within the outer shell, a layer of unimpregnated flexible woven ballistic fabric between said shells and having a major portion of its surfaces free to move with respect to said shells, said ballistic fabric normally permitting the passage therethrough of said resin in its uncured state, a first film of material impervious to said shell impregnating resin in its uncured state disposed between said inner shell and said fabric layer, a second film of material impervious to said shell material impregnating resin in its uncured state disposed between said fabric layer and said outer shell and means for retaining said shells and said layer in assembled relationship.

11. A ballistic helmet including in combination a hard inner shell formed from molded resin-impregnated fibrous material, a hard outer shell formed from molded resin-impregnated fibrous material, said shells being shaped in the configuration of a helmet with the inner shell adapted to be nested within the outer shell, a layer of unimpregnated flexible woven ballistic fabric between said shells and having a major portion of its surfaces free to move with respect to said shells, said ballistic fabric normally permitting the passage therethrough of said resin in its uncured state, a film of material impervious to said shell material impregnating resin in its uncured state disposed between said inner shell and said fabric layer and a plurality of spaced resin bonds between said outer shell and said inner shell, said bonds extending through said film and said fabric layer.

References Cited in the file of this patent

UNITED STATES PATENTS

| | | |
|---|---|---|
| 2,142,463 | Upson | Jan. 3, 1939 |
| 2,149,507 | Camfield | Mar. 7, 1939 |
| 2,378,642 | Kopplin | June 19, 1945 |
| 2,395,077 | Southwick | Feb. 19, 1946 |
| 2,401,281 | Webb | May 28, 1946 |
| 2,439,137 | Keller | Apr. 6, 1948 |
| 2,451,483 | Goldsmith | Oct. 19, 1948 |
| 2,465,257 | Nebesar | Mar. 22, 1949 |
| 2,532,442 | Daly | Dec. 5, 1950 |
| 2,650,184 | Biefeld | Aug. 25, 1953 |
| 2,713,016 | Weiss | July 12, 1955 |
| 2,718,583 | Noland et al. | Sept. 20, 1955 |
| 2,742,388 | Russell | Apr. 17, 1956 |
| 2,746,049 | Hudson | May 22, 1956 |
| 2,766,453 | Frieder et al. | Oct. 16, 1956 |
| 2,773,791 | MacIver | Dec. 11, 1956 |
| 2,778,761 | Frieder et al. | Jan. 22, 1957 |
| 2,789,076 | Frieder et al. | Apr. 16, 1957 |
| 2,794,756 | Leverenz | June 4, 1957 |

OTHER REFERENCES

"The Army Helmet Liner," Modern Plastics; May 1942; vol. 19, No. 9, pages 35–38; page 37 particularly relied upon.